United States Patent [19]

Wada et al.

[11] 3,962,198

[45] June 8, 1976

[54] HOT-MELT COMPOSITION

[75] Inventors: Akira Wada, Kamakura; Yorimitsu Shibata, Yokohama, both of Japan

[73] Assignee: Nippon Zeon Co., Ltd., Tokyo, Japan

[22] Filed: Apr. 1, 1975

[21] Appl. No.: 564,211

[30] Foreign Application Priority Data

Apr. 8, 1974 Japan.............................. 49-39609

[52] U.S. Cl................................ 260/889; 260/887; 526/308; 526/322; 526/325; 526/329; 526/331; 526/342; 526/350
[51] Int. Cl.² ..................... C08L 9/02; C08L 23/04
[58] Field of Search.................. 260/887, 889, 83.5, 260/82.3

[56] References Cited
UNITED STATES PATENTS

| | | | |
|---|---|---|---|
| 2,559,790 | 7/1951 | Peters................................ | 260/83.5 |
| 2,689,232 | 9/1954 | Gerhart............................. | 260/83.5 |
| 2,689,240 | 9/1954 | Gerhart............................. | 260/83.5 |
| 3,487,054 | 12/1969 | Minneryl, Jr. et al. ............ | 260/83.5 |
| 3,642,750 | 2/1972 | Wegenmund et al............... | 260/89.5 |
| 3,709,924 | 1/1973 | Tarney et al....................... | 260/889 |

*Primary Examiner*—Murray Tillman
*Assistant Examiner*—J. Ziegler
*Attorney, Agent, or Firm*—Wenderoth, Lind & Ponack

[57] ABSTRACT

A hot-melt composition comprising

[A] a cyclopentadiene-type resin having a bromine number of not more than 70 and a softening point of 50° to 170°C., said resin being the polymerization reaction product of 90 to 40% by weight of (I) a monomer containing a cyclopentadiene skeleton with 10 to 60% by weight of (II) at least one polar unsaturated monomer selected from the group consisting of (i) organic unsaturated cyano compounds containing 3 to 6 carbon atoms, (ii) alkenyl alkanoates derived from aliphatic monocarboxylic acids containing 1 to 4 carbon atoms and vinyl alcohol or allyl alcohol, and (iii) unsaturated carboxylic acid esters derived from unsaturated carboxylic acids containing 3 to 4 carbon atoms and aliphatic alcohols containing 1 to 6 carbon atoms, and

[B] an ethylenic copolymer.

6 Claims, No Drawings

HOT-MELT COMPOSITION

This invention relates to a novel hot-melt composition, and more specifically, to a hot-melt composition with good adhesiveness comprising a cyclopentadiene-type resin and an ethylene-type copolymer.

Since hot-melt compositions do not contain organic solvents, they do not cause toxicity to the working personnel and have superior operability. For this reason, the hot-melt compositions have recently come into wide use as adhesives, coating agents or sealants for a variety of materials such as paper, wood, metals or plastics.

Ths base polymer of the hot-melt composition generally used is a thermoplastic polymer including, for example, polyethylene, an ethylene/vinyl acetate copolymer, an ethylene/ethyl acrylate copolymer, atactic polypropylene, polyamides, polyesters, polyacetals, polyvinyl acetate, or a styrene/butadiene block copolymer, etc. Of these, ethylenic copolymers such as an ethylene/vinyl acetate copolymer or an ethylene/ethyl acrylate copolymer are widely used because they have superior properties such as adhesiveness, rigidity, suppleness, flexibility, cold resistance or heat meltability-flowability, and are available at low cost.

In order to improve adhesiveness and operability, rosins, terpene resins or petroleum resins are usually incorporated in the hot-melt composition as a tackiness-imparting agent. If desired, waxes, fillers, plasticizers, antioxidants, etc. are also incorporated. The resulting composition is heat-melted and kneaded, and fabricated into a desired shape such as a powder, block, rod, pellet, film or sheet. The fabricated compositions are used as adhesives in various uses such as the bonding of paper, plastic films or sheets, the production of paperboards or plywood, book binding, packaging, woodworking, shoemaking, or assembling of component parts, and also as coating agents or sealants.

Of the above tackiness-imparting agents, the rosins are most frequently used for hot-melt compositions because they have good compatibility with the base polymer as compared with the other tackiness-imparting agents, and can impart superior tackiness, adhesiveness and operability to the hot-melt compositions. The supply of the rosins is unstable, however, since they are naturally occurring substances, and moreover their prices are very high because of the difficulty of meeting the huge demand. In an attempt to overcome this difficulty, various rosin substitutes have been proposed. For example, an attempt has already been made to prepare hot-melt compositions by blending a cyclopentadiene homopolymer or copolymers of cyclopentadiene and mono- or di-olefins, with ethylenic copolymers such as an ethylene/vinyl acetate copolymer or an ethylene/ethyl acrylate copolymer as a base polymer. These substitute materials, however, are unable to impart such desirable properties as are comparable to those given by the rosins.

It is an object of this invention therefore to provide a hot-melt composition comprising an ethylenic copolymer and a novel tackiness-imparting agent, which is cheaper and has better properties than in the case of using rosins as the tackiness-imparting agent.

Other objects of this invention will be apparent from the following description.

We have found that a resin obtained by the polymerization of cyclopentadiene-type monomer with a certain polar unsaturated monomer is a tackiness-imparting agent which meets the above object of this invention.

According to this invention, there is provided a hot-melt composition comprising

[A] a cyclopentadiene-type resin having a bromine number of not more than 70 and a softening point of 50° to 170°C., said resin being the polymerization reaction product of 90 to 40% by weight of (I) a cyclopentadiene-type monomer with 10 to 60% by weight of (II) at least one polar unsaturated monomer selected from the group consisting of (i) organic unsaturated cyano compounds containing 3 to 6 carbon atoms, (ii) alkenyl alkanoates derived from aliphatic monocarboxylic acids containing 1 to 4 carbon atoms and vinyl alcohol or allyl alcohol, and (iii) unsaturated carboxylic acid esters derived from unsaturated carboxylic acids containing 3 to 4 carbon atoms and aliphatic alcohols containing 1 to 6 carbon atoms, and

[B] an ethylenic copolymer.

The cyclopentadiene-type monomer (I) used in this invention denotes a monomer containing a cyclopentadiene skeleton, and includes cyclopentadiene, dicyclopentadiene, methyl cyclopentadiene, methyl cyclopentadiene dimer, or mixtures of these. Since the cyclopentadiene is present stably at room temperature as dicyclopentadiene, the cyclopentadiene and dicyclopentadiene are usually dealt with in the same way.

Examples of the compounds included within the polar unsaturated monomer (II) are as follows:

Acrylonitrile, methacrylonitrile and vinylidene cyanide as the organic unsaturated cyano compound (i) containing 3 to 6 carbon atoms; vinyl formate, vinyl acetate, vinyl propionate, vinyl butyrate, allyl formate, allyl acetate, allyl propionate, and allyl butyrate as the alkenyl alkanoate (ii) derived from an aliphatic monocarboxylic acid containing 1 to 4 carbon atoms and vinyl alcohol or allyl alcohol; and methyl acrylate, ethyl acrylate, propyl acrylate, butyl acrylate, methyl methacrylate, ethyl methacrylate, propyl methacrylate, and butyl methacrylate as the unsaturated carboxylic acid ester (iii) derived from an unsaturated carboxylic acid containing 3 to 4 carbon atoms and an aliphatic alcohol containing 1 to 6 carbon atoms. The most useful polar unsaturated monomers (II) in this invention are acrylonitrile, vinyl acetate and methyl methacrylate.

The cyclopentadiene-type resin [A] can be prepared by heating a mixture of 90 to 40% by weight of the cyclopentadiene-type monomer (I) with 10 to 60% by weight of the above polar unsaturated monomer (II) in an atmosphere of an inert gas in an autoclave at a temperature of 200° to 300°C., preferably 250° to 280°C. for a period of 0.5 to 20 hours, preferably 1 to 10 hours, with or without the use of an inert hydrocarbon solvent such as benzene, toluene, xylene or solvent naphtha, and removing the unreacted monomers and the hydrocarbon solvent by conventional polymer purifying procedures such as evaporation or steam distillation. During the heating step, an organic radical initiator, such as benzoyl per-oxide, cumene hydroperoxide or lauroyl peroxide may be added to the reaction system.

When the amount of the cyclopentadiene-type monomer (I) exceeds 90% by weight, and the amount of the polar unsaturated monomer (II) is less than 10% by weight, the resulting cyclopentadiene-type resin [A] has too high a softening point. Thus, the incorporation of this resin [A] into the ethylenic copolymer [B] would not give a hot-melt composition having superior bond strength (adhesive strength). On the other hand, when the amount of the cyclopentadiene-type monomer (I) is less than 40% by weight, and the amount of the polar unsaturated monomer (II) exceeds 60% by weight, the resulting cyclopentadiene-type resin [A] has poor color and a low softening point. For this reason, addition of this resin [A] to the ethylenic copolymer [B] would not afford a hot-melt composition having superior bond strength and commercial value.

In one embodiment of this invention, the cyclopentadiene-type resin [A] can be a resin obtained by polymerizing the cyclopentadiene-type monomer (I) and the polar unsaturated monomer (II) and up to 20% by weight, based on the total amount of (I) and (II), of an unsaturated monomer not containing a polar group. This cyclopentadiene-type resin [A] has improved stability to oxidation, and its softening point can be easily controlled. Examples of the unsaturated monomer not containing a polar group are styrene, ethylene, propylene, butene, pentene, cyclopentene, butadiene, isoprene, 1,3-pentadiene, or a polymerizable monomeric mixture contained in $C_4$-$C_6$ fractions formed as by-products in the manufacture of ethylene by naphtha cracking.

In another embodiment, the cyclopentadiene-type resin [A] can be a modified resin obtained by hydrogenating the resin obtained by polymerizing the monomeric mixture in the same way as above, in a customary manner in the presence of a catalyst such as nickel or palladium. This cyclopentadiene-type resin [A] has reduced coloration and improved weatherability.

The cyclopentadiene-type resins [A], irrespective of the method for their preparation, must have a softening point, as measured by the ring and ball method stipulated in JIS K2531, of 50° to 170°C. If the cyclopentadiene-type resin [A] has a softening point of less than 50°C., a hot-melt composition obtained by incorporating it in the ethylenic copolymer [B] has a low cohesive force, and suffers from the defect that a very long open time is required in a bonding operation using such a hot-melt composition. On the other hand, if the softening point of the resin [A] is higher than 170°C., the resin generally has poor compatibility with the ethylenic copolymer [B] and cannot afford a hot-melt composition having superior bond strength when blended with the ethylenic copolymer [B]. Although very rarely, some resins [A] have a softening point higher than 170°C. and yet are well compatible with the ethylenic copolymer [B]. Hot-melt compositions obtained by blending such resins [A] with the ethylenic copolymer [B] have an advantage of a high cohesive force, but suffer from the defect that they have poor operability because of the need for high temperatures in a bonding operation.

The cyclopentadiene-type resin [A] must also have a bromine number, as measured in accordance with JIS K2543, of not more than 70, preferably not more than 20. Resins [A] having a bromine number of more than 70 have poor weatherability, and afford hot-melt compositions having a markedly reduced strength with time when blended with the ethylenic copolymer [B].

The softening point and the bromine number of the cyclopentadiene-type resin [A] can be easily controlled by adjusting the proportions of the monomers, the polymerization temperature, the polymerization time, or the amount of solvent used in polymerizations.

Examples of the ethylenic copolymer [B] used in this invention include a copolymer of ethylene and vinyl acetate, a copolymer of ethylene and ethyl acrylate, a copolymer of ethylene and acrylic acid, and copolymers of ethylene and unsaturated carboxylic acids, their salts or esters. Of these, ethylene/vinyl acetate copolymers having a vinyl acetate content of 5 to 60% and a melt index of 0.5 to 450 are most suitable.

The ratio between the cyclopentadiene-type resin [A] and the ethylenic copolymer [B] differs according to the end use of the hot-melt composition, for example, whether it is used as an adhesive, coating agent or sealant, and also according to the type of the adherend when it is used as adhesives. Accordingly, there is no special restriction on the ratio between the cyclopentadiene resin [A] and the ethylenic copolymer [B], but those skilled in the art can determine a desired ratio. Generally, however, the suitable ratio is 5 to 300 parts by weight, especially 50 to 200 parts by weight, of the cyclopentadiene resin [A] per 100 parts by weight of the ethylenic copolymer [B].

If desired, same as in the case of hot-melt compositions in general, the hot-melt composition of this invention may contain waxes such as paraffin wax, microcrystalline waxes and polyethylne wax, antioxidants, plasticizers and fillers in addition to the above ethylenic copolymer [B] and the cyclopentadiene-type resin [A].

The hot-melt composition of this invention is prepared, for example, by placing the above ingredients in a melting kettle at 100° to 200°C. either simultaneously or in the order of increasing melt-viscosity, melt-mixing them under heat, and then fabricated into a suitable shape such as a powder, block, rod, pellet, film or sheet. The fabricated hot-melt composition is used in ultimate usages.

The following non-limitative Examples specifically illustrate the present invention.

EXAMPLE 1

A 1-liter autoclave was charged with 450 gr of dicyclopentadiene (DCPD for short) and various polar unsaturated monomers in the ratios shown in Table 1 and 120 gr of xylene, and they were reacted at 260°C. for 3 hours in an atmosphere of nitrogen. The unreacted monomers and xylene were removed by distillation from the resulting polymer solution to afford a cyclopentadiene-type resin [A]. The properties of each of the cyclopentadiene resins [A] obtained are shown in Table 1. In the table, the cyclopentadiene resins [A] Nos. 1, 7, 8 and 13 are outside the scope of this invention.

Table 1

| Cyclopentadiene resin [A] | Ratio of monomers (wt. %) | | Softening point (°C) | Color (Gardner) | Bromine number |
|---|---|---|---|---|---|
| | DCPD | Polar unsaturated monomer (*1) | | | |
| No. 1 (*2) | 100 | — — | 95 | 3 | 72.0 |
| No. 2 | 90 | (VAC) 10 | 95 | 3 | 64.3 |
| No. 3 | 80 | (VAC) 20 | 95 | 3 | 63.2 |
| No. 4 | 70 | (VAC) 30 | 90 | 4 | 62.7 |

Table 1-continued

| Cyclopentadiene resin [A] | Ratio of monomers (wt. %) | | Softening point (°C) | Color (Gardner) | Bromine number |
|---|---|---|---|---|---|
| | DCPD | Polar unsaturated monomer (*1) | | | |
| No. 5 (*3) | 70 | (VAC) 30 | 85 | 1 | 6.5 |
| No. 6 | 50 | (VAC) 50 | 75 | 5 | 60.5 |
| No. 7 | 30 | (VAC) 70 | 30 | 10 | 54.5 |
| No. 8 (*4) | 80 | (VAC) 20 | 175 | 5 | 62.1 |
| No. 9 | 70 | (MMA) 30 | 105 | 4 | 58.3 |
| No. 10 | 50 | (MMA) 50 | 84 | 5 | 60.1 |
| No. 11 | 70 | (AN) 30 | 102 | 5 | 64.4 |
| No. 12 | 50 | (AN) 50 | 114 | 7 | 62.2 |
| No. 13 | 70 | (PP) 30 | 100 | 4 | 62.0 |

Note:
(*1) VAC: vinyl acetate, MMA: methyl methacrylate, PP: 1,3-pentadiene
(*2) This cyclopentadiene resin was prepared by using 240 gr of DCPD and 360 gr of xylene and performing the reaction at 250°C. for 3 hours.
(*3) This cyclopentadiene resin was prepared by charging an autoclave with 100 gr of the resin [A] No. 4 and 2.5 gr of a nickel-diatomaceous earth catalyst, and the resin was hydrogenated at 260°C. for 3 hours with hydrogen at a pressure of 100 Kg/cm$^2$.
(*4) This cyclopentadiene resin was prepared by performing the reaction at 270°C. for 3 hours.

EXAMPLE 2

A hot-melt composition was prepared by kneading 40 parts by weight of each of the cyclopentadiene-type resins [A] prepared in Example 1 or commercially available resins, 40 parts by weight of an ethylene/vinyl acetate copolymer (EVAFLEX Nos. 220, made by Mitsui Polychemical Co., Ltd.), and 20 parts by weight of 145°F microcrystalline wax at 180°C. for 2 hours. The resulting hot-melt composition was coated at 140°C. onto two sheets of aluminum foil having a thickness of 0.2 mm and a width of 25 mm to a thickness of 50 microns using an applicator. The two aluminum foils were press-bonded to each other at 140°C. for 1.5 seconds to prepare test samples. The test samples were subjected to a T-type peel test in accordance with ASTM D1876-61T.

The softening point, tensile strength, elongation, compatibility and flexibility of the resulting hot-melt compositions were also measured. The softening point was measured in accordance with JIS K2531, and the tensile strength and elongation, in accordance with a modified form of JIS K6301. The compatibility was examined by a phase-contrast microscope, and evaluated on a scale of excellent, good and poor, in which "excellent" indicates that there is no distinct interface, "poor" indicates that there is a distinct interface, and "good" indicates the state intermediate between "excellent" and "poor." In the measurement of the flexibility, the coated aluminum foil is bended 180° at room temperature, and evaluated on a scale of excellent, good and poor, in which "excellent" indicates that no crack occurs, "poor" indicates there is a marked occurrence of cracks, and "good" indicates that there is some crack formation.

The results are shown in Table 2. It is clear from the results shown in Table 2 that the hot-melt compositions of this invention have superior compatibility, flexibility and peel strength to the control examples.

Table 2

| | Cyclopentadiene resins [A] or commercially available resins | | Softening point (°C) | Hot-melt compositions | | | | Peel strength (gr/ 25 mm) |
|---|---|---|---|---|---|---|---|---|
| | Type | Ratio of the monomers (wt. %) | | Tensile strength (Kg/cm$^2$) | Elongation (%) | Compatibility | Flexibility | |
| Invention | No. 2 | DCPD/VAC= 90/10 | 67.0 | 39.0 | 138 | Good | Good | 2220 |
| | No. 3 | DCPD/VAC= 80/20 | 67.5 | 37.2 | 159 | Excellent | Excellent | 2760 |
| | No. 4 | DCPD/VAC= 70/30 | 68.5 | 37.2 | 201 | Excellent | Excellent | 3500 |
| | No. 5 | DCPD/VAC= 70/30 | — | — | — | Good | Good | 2550 |
| | No. 6 | DCPC/VAC= 50/50 | 60.0 | 32.2 | 230 | Excellent | Excellent | 3200 |
| | No. 9 | DCPD/MMA= 70/30 | — | — | — | Excellent | Excellent | 2800 |
| | No. 10 | DCPD/MMA= 50/50 | — | — | — | Excellent | Excellent | 3150 |
| | No. 11 | DCPD/AN= 70/30 | — | — | — | Excellent | Excellent | 3250 |
| | No. 12 | DCPD/AN= 50/50 | — | — | — | Excellent | Excellent | 3400 |
| Controls | No. 1 | DCPD = 100 | 67.0 | 39.7 | 126 | Poor | Poor | 870 |
| | No. 7 | DCPD/VAC= 30/70 | 55.0 | 31.5 | 250 | Good | Good | 450 |
| | No. 8 | DCPD/VAC= 80/20 | 71.5 | 30.5 | 105 | Poor | Poor | 380 |
| | No. 13 | DCPD/PP= 70/30 | 68.5 | 37.5 | 150 | Poor | Poor | 860 |

Table 2-continued

|  |  |  |  |  |  |  |  |
|---|---|---|---|---|---|---|---|
| Controls | Petroleum resin (P) | 70.5 | 43.0 | 79 | Poor | Poor | 200 |
|  | Petroleum resin (Q) | 70.0 | 43.8 | 79 | Poor | Poor | 190 |
|  | Hydrogenated petroleum resin (R) | 64.5 | 31.2 | 123 | Good | Poor | 1470 |
|  | Hydrogenated petroleum resin (S) | 69.5 | 47.9 | 29 | Poor | Poor | 240 |

Note:
Petroleum resin (P): "WINGTACK 95", made by Goodyear Tire and Rubber Co.
Petroleum resin (Q): "SUPERSTATACK 100", made by Reichhold Chemical Inc.
Petroleum resin (R): "ESCOREZ 5300", made by Esso Chemical Co.
Petroleum resin (S): "ARKON P-100", made by Arakawa Rinsan Kogyo Co., Ltd.

EXAMPLE 3

A hot-melt composition consisting of 40 parts by weight of each of some cyclopentadiene-type resins [A] obtained in Example 1 or commercially available resins and 60 parts by weight of the ethylene/vinyl acetate copolymer obtained in Example 2 was prepared, and used. Otherwise, the same test as in Example 2 was performed. The results are shown in Table 3.

It is clear from Table 3 that the hot-melt compositions of this invention are comparable to hot-melt compositions using rosins or rosin esters (considered best among the conventional hot-melt compositions) in compatibility and are superior to them in peel strength, and that they have far superior compatibility and peel strength to the hot-melt compositions using rosins or rosin esters and all other control hot-melt compositions.

Table 3

| | | Hot-melt composition | | | |
|---|---|---|---|---|---|
| | Cyclopentadiene resin [A] or commercially available resins | Peel strength (gr/25 mm) | Tensile strength (Kg/cm$^2$) | Elongation (%) | Compatibility |
| Invention | No. 2 | 6340 | 17.9 | 1408 | Excellent |
|  | No. 3 | 7930 | 21.0 | 1230 | Excellent |
|  | No. 4 | 7790 | 16.4 | 1581 | Excellent |
|  | No. 6 | 6505 | 17.0 | 1400 | Excellent |
|  | No. 1 | 1540 | 14.7 | 1009 | Poor |
|  | No. 7 | 1100 | 13.5 | 1500 | Poor |
|  | No. 8 | 955 | 12.1 | 985 | Poor |
| Controls | Petrolem resin (P) | 1540 | 17.1 | 824 | Poor |
|  | Petroleum resin (Q) | 1850 | 24.7 | 1159 | Poor |
|  | Hydrogenated Petroleum resin (R) | 4300 | 12.8 | 274 | Good |
|  | Hydrogenated petroleum resin (S) | 3500 | 18.4 | 783 | Poor |
|  | Rosin* | 4660 | 14.2 | 2550 | Excellent |
|  | Rosin ester** | 4610 | 18.0 | 1300 | Excellent |

Note:
*"ROSIN WW", made by Arakawa Rinsan Kogyo Co., Ltd.
**"ESTERGUM H", made by Arakawa Rinsan Kogyo Co., Ltd.

What we claim is:

1. A hot-melt composition comprising
[A] a cyclopentadiene resin having a bromine number of not more than 70 and a softening point of 50° to 170°C., said resin being the polymerization reaction product of 90 to 40% by weight of (I) a monomer containing a cyclopentadiene skeleton with 10 to 60% by weight of (II) at least one polar unsaturated monomer selected from the group consisting of (i) organic unsaturated cyano compounds containing 3 to 6 carbon atoms, (ii) alkenyl alkanoates derived from aliphatic monocarboxylic acids containing 1 to 4 carbon atoms and vinyl alcohol or allyl alcohol, and (iii) unsaturated carboxylic acid esters derived from unsaturated carboxylic acids containing 3 to 4 carbon atoms and aliphatic alcohols containing 1 to 6 carbon atoms, and
[B] a copolymer containing ethylene.

2. The hot-melt composition of claim 1 which comprises 5 to 300 parts by weight of the cyclopentadiene resin [A] and 100 parts by weight of the copolymer containing ethylene [B].

3. The hot-melt composition of claim 1 wherein said unsaturated monomer (II) is acrylonitrile.

4. The hot-melt composition of claim 1 wherein said unsaturated monomer (II) is vinyl acetate.

5. The hot-melt composition of claim 1 wherein said unsaturated monomer (II) is methyl methacrylate.

6. The hot-melt composition of claim 1 wherein [B] is a copolymer of ethylene and vinyl acetate.

* * * * *